(12) United States Patent
Deng et al.

(10) Patent No.: US 6,947,376 B1
(45) Date of Patent: Sep. 20, 2005

(54) LOCAL INFORMATION-BASED RESTORATION ARRANGEMENT

(75) Inventors: Mei Deng, Holmdel, NJ (US); Peter M Dollard, Highlands, NJ (US); Z Ming Ma, Murray Hill, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/425,151

(22) Filed: Oct. 21, 1999

(51) Int. Cl.[7] .............................. H04J 1/16; H04J 3/14; H04L 1/00; H04L 12/26
(52) U.S. Cl. ...................................... 370/219; 370/220
(58) Field of Search ................................ 370/216, 217, 370/218, 219, 220, 222, 224, 241, 539, 541, 228

(56) References Cited

U.S. PATENT DOCUMENTS

| | | | | |
|---|---|---|---|---|
| 5,537,532 A | * | 7/1996 | Chng et al. ..................... 714/4 |
| 5,590,118 A | * | 12/1996 | Nederlof ..................... 370/218 |
| 5,598,403 A | * | 1/1997 | Tatsuki ....................... 370/221 |
| 5,706,276 A | * | 1/1998 | Arslan et al. ................ 370/216 |
| 5,805,798 A | * | 9/1998 | Kearns et al. ................ 714/48 |
| 5,812,524 A | * | 9/1998 | Moran et al. ............... 370/228 |
| 5,832,196 A | * | 11/1998 | Croslin et al. ................. 714/4 |
| 5,881,048 A | * | 3/1999 | Croslin ....................... 370/228 |
| 6,038,212 A | * | 3/2000 | Galand et al. .............. 370/216 |
| 6,134,671 A | * | 10/2000 | Commerford et al. ......... 714/4 |
| 6,163,525 A | * | 12/2000 | Bentall et al. .............. 370/227 |
| 6,167,025 A | * | 12/2000 | Hsing et al. ................ 370/216 |
| H1940 H | * | 2/2001 | Lohn, III ..................... 370/216 |
| 6,282,170 B1 | * | 8/2001 | Bentall et al. .............. 370/225 |
| 6,327,243 B1 | * | 12/2001 | Gregorat ..................... 370/218 |
| 6,327,675 B1 | * | 12/2001 | Burdett et al. ................ 714/11 |
| 6,633,538 B1 | * | 10/2003 | Tanaka et al. .............. 370/222 |
| 2003/0058804 A1 | * | 3/2003 | Saleh et al. ................. 370/254 |

\* cited by examiner

Primary Examiner—Ajit Patel
Assistant Examiner—Chirag Shah

(57) ABSTRACT

A network that is architectured to distributively be responsible for remedying failures achieves advantageous operation. This is accomplished by algorithmically and distributively assigning the responsibility for recovery from all failures to different network nodes and by re-routing traffic at the failed point though network elements in close topological proximity to the failed point. Each node maintains an awareness of the spare resources in its neighborhood and pre-plans re-route plans for each of the failures for which it is responsible. It maintains the created re-route plans and, upon detection of a failure, transmits a re-route plan to particular nodes that participate in the re-routing recovery planned for such a failure. Alternatively, it transmits re-route plans to the nodes that need them, and upon detection of a failure, the network node broadcasts an ID of the re-route plan that needs to be executed. Nodes that receive a plan ID that corresponds to a plan that they possess execute the relevant plan. Whenever the spare resources change in a manner that suggests that a re-route plan needs to be revisited, the network node initiates a new re-route preplanning process.

6 Claims, 2 Drawing Sheets

LOCAL INFORMATION-BASED RESTORATION ARRANGEMENT

BACKGROUND OF THE INVENTION

This invention relates to restoration of service in a telecommunications network.

With the advent of SONET rings, customer expectation of rapid network restoration has taken a substantial leap. Prior to the optical transport era, failed network connectivity due to a cable cut typically took four to six hours for manual repair. In 1989, AT&T introduced FASTART™ in which a central operations system (called "RAPID") oversees network connectivity with the aid of a team of monitors strategically placed throughout the network. When a failure occurs at a network element or a facility, alarms from the monitors with a view of the failure are sent to RAPID for root cause analysis. RAPID correlates the failed component to the disabled services, generates a list of service-bearing facilities to be restored, and proceeds with restoration based on a priority ordering of the service facilities. Restoration is effected using dedicated spare capacities that are strategically distributed throughout the network, in amounts averaging about 30% of the service capacity. Typically, the Time-To-Restore metric ranges from three minutes for the first channel restored on up to ten or twenty minutes for the last few channels in large scale failure events. This was a major improvement over the performance of prior restoration paradigms.

Still, FASTAR has certain limitations rooted in its central control architecture. For example, central collection of alarms creates a bottleneck at the central processor. In a large scale failure event, many alarm messages, perhaps from several monitors, need to be sent to the central processor. The central processor must stretch its event window in order to have reasonable assurrance of receiving all messages and obtaining a complete view of the failure. Also, the problem of planning restoration paths for many disparate routes is mathematically complex and quite difficult to solve, leading to restoration reroute solutions that are typically suboptimal.

In 1995, network elements and transport facilities conforming to the SONET standards were introduced into AT&T transport network. The SONET standards introduced two new topographical configurations, namely, linear chain and closed ring, and in the latter the new restoration paradigm of ring switching. SONET linear chains and rings employ stand-by capacities on a one-for-one basis. That is, for every service channel, there is a dedicated, co-terminated protection channel. As in the older technologies, when a failure occurs on the service line of a span in either a linear chain or a closed ring, the SONET Add/Drop Multiplexers (ADMs) adjacent to the failed span execute a coordinated switch to divert traffic from the failed service channel to the co-terminated protection channel. When both the service and protection lines of a span have failed, however, a SONET ring provides the further capability to switch traffic on the failed span instead to the concatenated protection channels on surviving spans completing a path the opposite way around the ring. The ADMs at the two ends of the failed span each loop the affected traffic back onto the protection channels of the adjacent spans, whence the remaining ADMs around the ring cooperate by completing through connection of the protection channels the entire way around the ring. Since failure detection and protection switching are done automatically by the ADMs, restoration is typically fast and can routinely take less than 200 ms. In short, by setting aside a 100% capacity overhead in the standby mode and configuring facilities in closed rings, SONET standards make possible a three orders of magnitude improvement in restoration time over FASTAR. The challenge has thus shifted to designing a network that is restorable with SONET ring-like performance but without the high penalty in required overhead capacity.

SUMMARY OF THE INVENTION

An advance in the art is achieved with an arrangement that employs the notion that a failure at any point in the network can be quickly remedied by rerouting traffic at the failed point though network elements in close topological proximity to the failed point. This is accomplished by algorithmically and distributively assigning the responsibility for recovery from all failures to different network nodes. In one illustrative embodiment, each failure is assigned to one primary command node, and to a secondary, backup, command node.

Each node maintains awareness of the spare resources in its neighborhood and pre-plans re-route plans for each of the failures for which it is responsible. It maintains the created re-route plans and, upon detection of a failure, transmits a re-route plan to particular nodes that participate in the re-routing recovery planned for such a failure. Alternatively, it transmits re-route plans to the nodes that need them, and upon detection of a failure, the network command node broadcasts an ID of the re-route plan that needs to be executed. Nodes that receive a plan ID that corresponds to a plan that they possess execute the relevant plan.

Whenever the spare resources change in a manner that suggests that a re-route plan needs to be revisited, the network node initiates a new re-route preplanning process.

DETAILED DESCRIPTION

Figure 1:
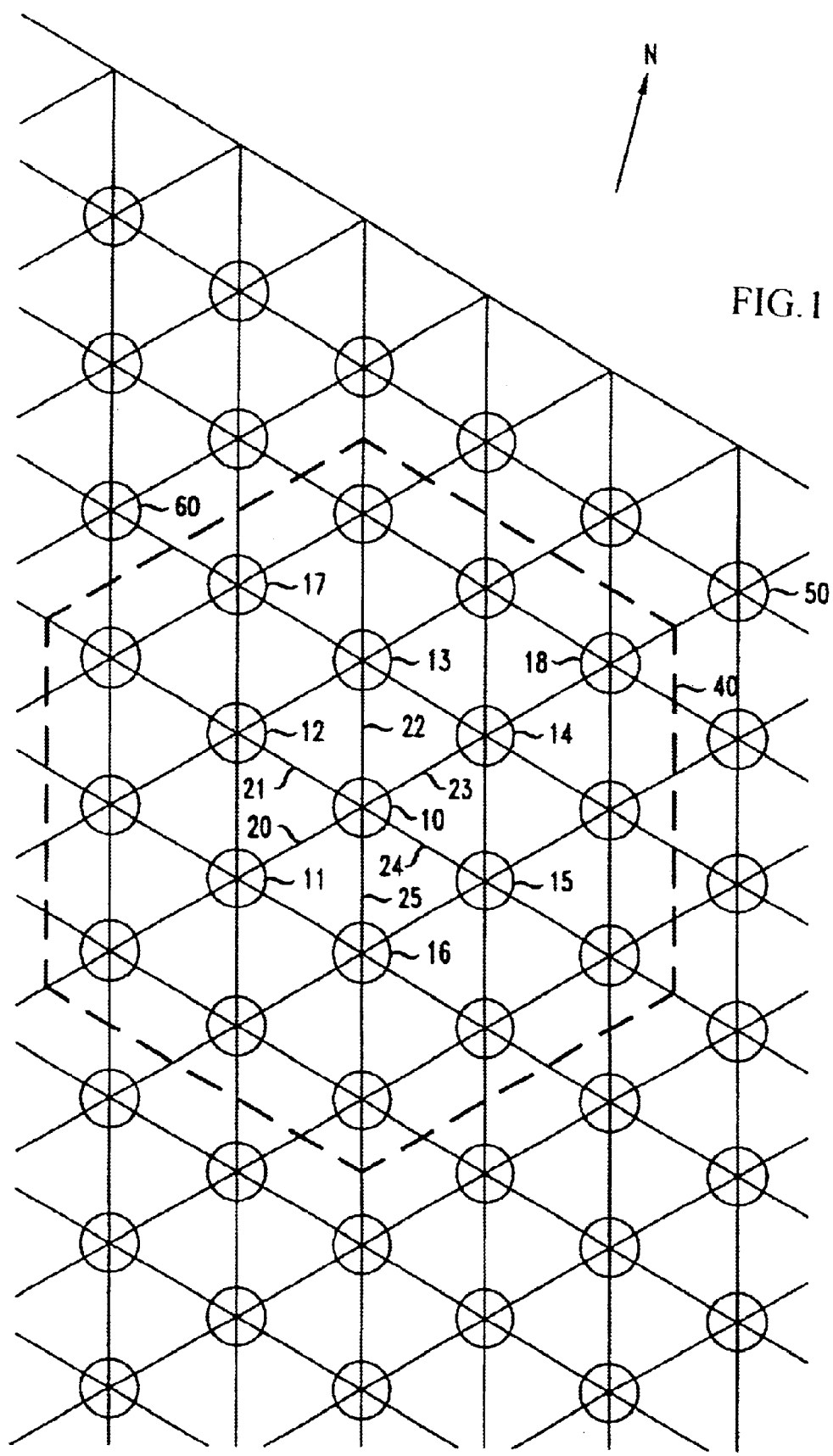
FIG. 1 depicts a network and illustrates the concept of a neighborhood.

A distributed control system potentially is faster; more efficient and more robust than a central control system. Therefore the failure restoration management system disclosed herein centers on the use of a distributed restoration management of local failure. In accordance with the principles disclosed herein, the concept of a neighborhood is employed, based on the fact that the most efficient restoration routes are highly likely to pass through a small collection of nodes within close topological proximity to the failure site. FIG. 1 presents a view of a network in which the principles disclosed herein may be applied. For ease of understanding, the depicted network is of a very simple and regular topology (hexagonal) but, of course, that is not a requirement of this invention.

To better understand the description that follows, it is useful to review some of the nomenclature employed herein.

In the context of this disclosure, a path corresponds to the route over which communication is passed from an originating point in the network to a terminating point. Typically, a customer's terminal is connected to the originating point, another customer's terminal is connected to the terminating point, and the path provides a connection between the two.

The path is made up of links that are coupled to each other by means of nodes. Typically an adjacent pair of nodes will be joined by a large bundle of links. The link bundle may comprise the wavelengths in a multi-wavelength transport medium, or the channels in a channelized broadband transport medium, or any combination of similar means of bundling. A node is an element that routes signals of an incoming link to one of a number of outgoing links. Physically, this element is implemented with a switch or cross-connect (in circuit-switched applications), or a router (in packet-switched applications). Each link connects to a particular port on the nodal element at each of its ends.

The physical connection between nodes can be a cable (optical fibers, coax, etc.) or a collection of cables, each bearing one or more link bundles. A collection of cables leaving a particular node (say, node A) can be connected to a branch point (say, T) where the collection is split. Some of the cables are connected to cables that go to a node B while the others of the cables are connected to cables that go to a node C. Similarly, the collections from T to B and from T to C may contain cables that connect B to C. Because the branch point has no switching or routing capabilities, it is not termed a "node." The collection of cables that span between two points (be it two nodes, two branch points, or one node and one branch point) is called a span. Thus, a link is a logical connection between ports on two nodes, that physically can pass through one or more spans.

The collection of link bundles, each traversing one or more of the spans in a configuration like the one just described, is called a shared risk link group. Any two link bundles belong to the same shared risk link group if both traverse the same span, or each separately has a span-sharing association with a third link bundle, or (in extreme examples) the two are related through an unbroken chain of span-sharing associations.

A neighborhood is node-centric. It is a collection of nodes that are reachable from the subject node through a preset number of link hops, n. FIG. 1 shows an example of the neighborhood of a node 10, where n=2, delineated by hexagon 40. As arranged in FIG. 1, a neighborhood e.g., 40 of a node 10 comprises 18 nodes that surround the subject node and the links that connect them. To simplify this description, the FIG. 1 arrangement comprises no branch points, resulting in each link bundle traversing just one span, and in the entire network being free of shared risk link groups.

In accordance with the principles disclosed herein, each node maintains information about its neighborhood. Specifically, each node is informed of the identity of the nodes and the links that are within its neighborhood, the node port assignments at the two ends of each link, plus which of the links are cross-connected and to what other links (therefore in-use in paths) and which are not cross-connected (therefore idle and available as spare). This information is stored in memory of the node. The way that a node maintains this knowledge current is quite simple. When a node is equipped with a new port, it immediately attempts a hand-shake exchange with whatever node may be connected at the far end. One means of hand-shake is for the node to begin immediately to transmit a "keep-alive" idle-channel signal outbound from the port, bearing its own node ID and the identity of the particular port. At the same time it begins to monitor the receive side of the port for arrival of a like signal from the opposite node. Upon receiving such a signal, it proceeds to enter the new connectivity to its database, marking the new link as "available spare". Then, and whenever thereafter it detects any other change in its connectivity, it broadcasts a message to all immediately adjacent nodes. The change may correspond to increased spare capacity because of installation of a new link as just described, or because of released links when a path is taken down, or it may correspond to reduced spare capacity because of new path provisioning or link failures, etc. The node updates its own information based on those changes and also broadcasts the information to its neighbors.

The broadcast is over all of the link bundles emanating from the node. In addition to details of the incremental change, the message includes a rebroadcast index set to 0 to indicate that it is the first node to broadcast the message. A node that receives this message updates its own information, increments the rebroadcast index by 1, and if that index is less than n, rebroadcasts the received information to the far end nodes of all of the link bundles emanating from it, other than the one from which it originally received the information.

With the very simple broadcast approach described above, a node might receive the same broadcast message a number of times. However, it is relatively easy to have the nodes recognize and ignore subsequent receptions of an earlier message, unless the rebroadcast index is less than that of the initial reception. If a later-received message does have a lower rebroadcast it must be handled as if it were the first in order to assure the message will propagate to the desired neighborhood boundary).

Through this updating protocol, all nodes in the neighborhood of node 10 keep node 10 up to date almost instantaneously about changes both in service path provisioning and spare capacity availability in the neighborhood of node 10. The actual communication protocol that is used between nodes is not critical to this invention. An example of an acceptable protocol is any member of the IP protocol suite. The message channels may be either in-band on one of the links in each bundle, or out-of-band using an administrative data network.

In accordance with the principles of this invention, in addition to each node having its own neighborhood, each link bundle that connects two nodes has one of the nodes designated the command node (CN), while the other node is designated the backup command node (BCN). The designations can be arbitrary, but an algorithmic approach is preferred. One algorithmic approach is to select the node that is the higher of the two in an alpha-numerical ordering of node IDs. (Another might be to choose the western-most with ties going to the southern-most, if each node includes its Lattitude and Longtitude as part of its ID.) Whenever the first link in a new link bundle is added to the network, whether to a new node or between existing nodes, the two end nodes can negotiate the control designation accordingly. Thereafter, the one chosen must remain the CN for all links in the same bundle.

Normally, in accordance with the principles disclosed herein, the role of the CN for a given link bundle is a dual one: first, to carry out a restoration preplanning process for the bundle, and second, to trigger execution of the pre-plan upon detecting failure of any link or links in the bundle. In the case where the bundle belongs to a shared risk link group, however, one and only one of the CNs for all link bundles in the group must be designated as the planning node (PN) for the entire group. This is necessary in order that the pre-plans be coordinated and not conflict regardless which span creating the shared risk might fail. The roles of the other CNs are then limited to triggering execution of the plans for failures of the links they command. Since nodes do not otherwise have access to span data and cannot auto-discover shared risk link groups the way they auto-discover links, designation of the planning node must be made by a central authority such as a Network Administrator, who must also arrange for downloading of the shared risk link group topology to the designated PN.

The restoration plan for a link bundle is the same for a failure in any of the spans it traverses, and provides a separate plan for each link in the bundle, coordinated such that there will be no contention should the entire bundle fail. Any one node may be the CN for a number of link bundles. For example (absent any shared risk spans), in accordance with a west-most CN assignment rule, node 10 carries out the preplanning process for possible failure of the bundles borne on each of spans 23, 24, and 25. For purposes of this disclosure, only single bundle failures are considered, but it should be apparent to any skilled artisan that the principles of this invention extend both to failures of shared-risk spans and to multiple near-simultaneous span failures.

The restoration pre-planning process is undertaken automatically upon detection of any path provisioning or other change in available spare capacity within the command node's neighborhood. The restoration plan that is created is a partial path restoration. That is, it covers only that portion of an affected path that begins and ends within the command node's neighborhood. In creating a restoration plan, the CN (or other designated PN) considers all links in the bundle. The CN constructs a plan for rerouting each and all of them, on available spare links through nodes in its neighborhood, to get around the failed span. In generating the plan, the CN is cognizant of the available spare links between node pairs in its neighborhood as well as the intra-neighborhood segments of all service paths using links in the particular target bundle.

The minimum spare capacity required for restoration in the network is pre-computed and pre-allocated (i.e., dedicated for restoration). This capacity pool is augmented by capacity allocated for service path provisioning but currently idle. The pre-planning problem is essentially a multi-commodity flow problem that can be solved by conventional linear programming techniques. Basically, it is a classic resource allocation problem that can be represented by a set of equations which need to be solved simultaneously. Numerous techniques are known in the art for solving a set of simultaneous equations. Once the pre-plan process is complete, the CN considers each restoration action, and develops for that action the messages which will need to be delivered to each node that will participate in the restoration action. The message instructs each such node to establish connections within the node's switch or router so that paths can be created to route traffic around the failed span.

A particular node in the neighborhood of the CN responsible for a link bundle may be a participant in the restoration plan of several links in that bundle. As such, it may be the recipient of a composite message. The restoration plan messages can be sent to the nodes that participate in the various restoration plans at the time a failure occurs, except that the restoration plans are send immediately to the backup command node. Alternatively, the backup restoration plans may be tagged with a Plan ID and sent in advance (whenever a new or revised plan is complete) for local storage at the target node. The speed-of-recovery is somewhat higher in embodiments where the messages are sent to the participating nodes as soon as the plan is complete. This stems from the fact that a call for executing a particular plan (identified by its ID—which, effectively, is a pointer) requires less information transfer (and could use the broadcast mechanism) and, hence, is faster. Advantageously, each node that receives a restoration message performs sanity checks on these before committing them to storage. The messages are kept in storage pending notification by the appropriate CN to execute the pre-planned cross connects.

There are many possible alternative formats for the message that a CN would send to a participating node to instruct it to execute a particular plan. The message might be ID.nn, where the ID specifies the particular link bundle, and the nn specifies the restoration plan for the path using link nn in that bundle. The ID, for example, may have the form xx.yy, which specifies the command node and the backup command node, hence also the particular bundle. As indicated above, the instruction that a node will need to execute is to establish a connection within the switch or the router, from a first specified port, i, to a second specified port, j, so that path segments can be created to reroute traffic of the blocked link. The two port indices, i,j are sufficient for all rerouting nodes other than the Upstream Transfer Node (UTN) and Downstream Transfer Node (DTN). The UTN is the node in the failed path where the payload traffic is to be diverted from its original path onto the restoration route. The DTN is the point in the restored path where the payload traffic rejoins the original path. Note that for bidirectional restoration of bidirectional paths, the same node that serves as UTN for one signal direction serves as DTN for the opposite direction, and conversely. Regardless, at both the UTN and the DTN the required path transfer operations entail three ports. The three indices involved with the UTN correspond to the transfer from an i j connection to an i k connection, and if the restoration strategy so dictates, this will be implemented via bridging the i k connection onto the i j connection without deleting the latter. In any case, the three indices involved with the DTN transfer operation correspond to a switch (commonly termed a "roll") from an i j connection to an i k connection.

A node detects a link failure through the appearance of a failed-signal condition at its receive port, or due to electronic malfunction in the port itself. Some examples of failed-signal conditions to which the node must react include AIS-L (Alarm Indication Signal—Link), LOS (Loss of Signal), and LOF (Loss of Frame) or LOP (Loss of Pointer). A node detecting any such condition must insert a locally generated signal such as AIS-P (Alarm Indication Signal—Path) that is distinct from any of the possible link failure signal conditions, so that nodes further downstream of the failed line with the exception of those at the ends of the paths, will recognize the failure as one to which they must not autonomously respond.

Figure 2:
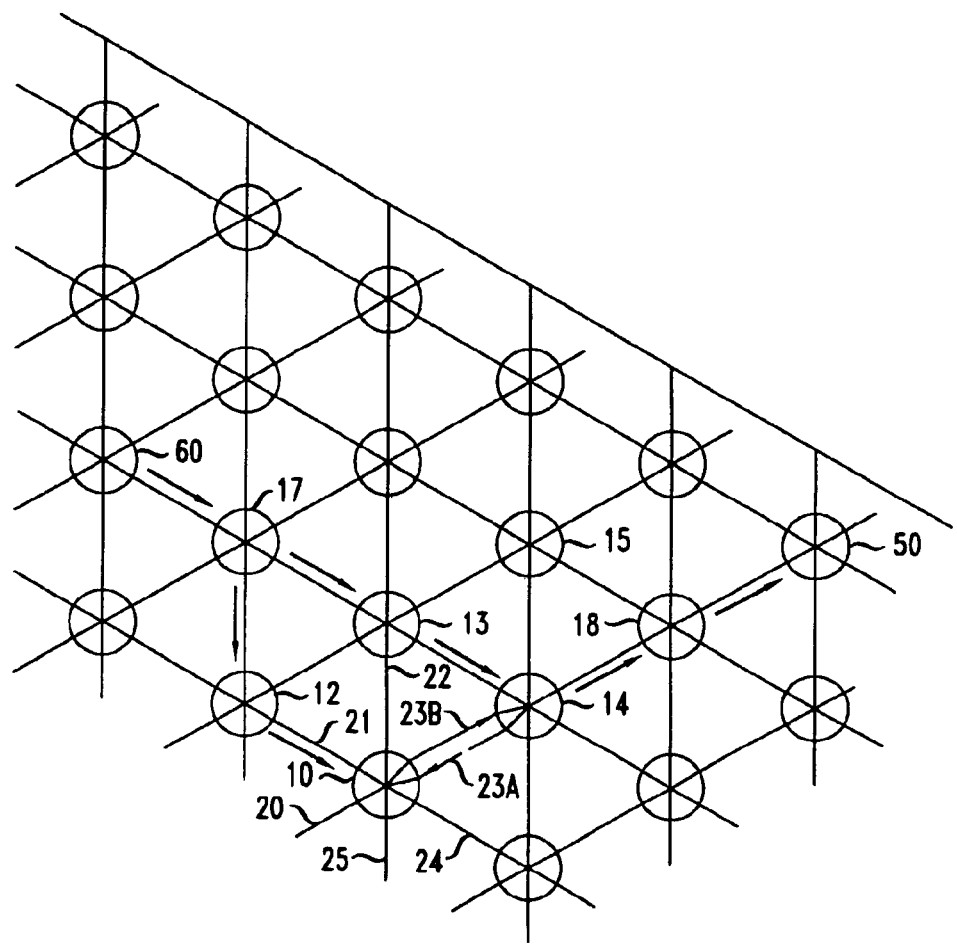
FIG. 2 illustrates a path and the nodes involved in rerouting to circumvent a failure on span 23-A.

A typical failure scenario is depicted in FIG. 2, where a particular path happens to exist between nodes 60 and 50, traversing nodes 17, 12, 10, 14, and 18. In this illustrative example, span 23 has traffic flowing in both directions (designates 23-A and 23-B), and the fiber that carries traffic from node 10 to 14 (span 23-B) is failed, possibly due to a partial cable cut. When node 14 detects the signal failure condition, it immediately sends out an AIS-P or equivalent signal downstream along the failed path (and all simultaneously failed paths), as previously noted.

Particularly if node 14 is not the command node, it must also send a signal to node 10 to alert it to the failure, in case the failure in fact proves to be one directional. This signal may be out-of-band on an administrative link network, in which case it must enumerate all failed links, or most advantageously it may be in-band on each failed link in the form of a "Far End Receive Failure—Link" (FERF-L) or equivalent signal. Similarly as in the case of AIS-L, a node receiving FERF-L must either substitute FERF-P, or in this case (since the FERF-L would appear in the overhead of an otherwise normal service signal) simply remove it from the signal propagating further downstream.

Since both nodes 10 and 14 know of the failure, the command node for the link bundle on span 23 takes control (e.g., node 10). The backup command node (node 14) sends an inquiry to the command node, such as ping of the Internet Protocol (IP), to determine that the command node is in good operating order. When the BCN receives an affirmative response, the BCN keeps "hands off", and the restoration continues under the control of the CN. Otherwise, the BCN assumes the role of CN and takes responsibility for restoring the failed link.

The CN consults its database and retrieves the restoration plan that it pre-planned for this failure. If the relevant part of the plan has already been sent to the participating nodes, the CN advantageously needs to merely broadcast a trigger message containing the plan ID to its immediate neighbors. The immediate neighbors cooperate by propagating the message deeper into the neighborhood, using the same rebroadcast index as for connectivity changes, until it reaches the limit of the CN's neighborhood. Each node receiving the trigger message checks its own database to determine whether it is a participant in the identified plan, and if so, proceeds to execute its part. If the relevant part of the plan has not already been sent to the participating nodes, the CN identifies the participating nodes and proceeds to download the relevant part to each participant in an IP message addressed to it. In this latter case it should be noted that the participant nodes might receive their orders in a somewhat random order depending on the IP routing scheme deployed. Since each node is to execute its task autonomously, the order of message arrival does not have an adverse effect.

It might be that the restoration plan for restoring a failure in fiber cable span 23 calls for nodes 17 and 14 each assigned the role of transfer node (both UTN and DTN assuming bi-directional restoration), and node 13 assuming the role of a cut-through node. After the restoration orders have been received, the participant nodes (17, 13, and 14) independently retrieve the relevant plan and execute their assigned tasks.

At the time of restoration execution, node 17 in its role as UTN starts from the state where, for the normal service path connection, the receive side of port i is connected to the transmit side of port j (and conversely for bidirectional service), port j being the port closest to the failure. Port k is the designated termination of the pre-planned restoration path. Assuming the network follows the generally recommended bridge-and-roll restoration strategy, the UTN task is to bridge the received service signal at port i to the transmit side of port k. Concurrently, node 14 in its UTN role sets up a similar bridge connection of the service signal in the opposite transmission direction to the port terminating its end of the restoration path. Each of the two nodes then, simultaneously, in their roles as DTN, bridges port k at the end of the restoration path to port i where payload from the restoration path joins the original path, and monitor the receive side of the restoration path port (port k at node 17) for onset of normal service signal replacing the distinctive keep-alive idle signal otherwise received at its end before the bridge connection at the opposite end and all intermediate cross-connects have been completed. Immediately upon detecting the onset of normal service signals, each independently completes the roll of service to the restoration path. The roll constitutes (for example, at node 17) a switch of the normal service connection (receive side of port j connected to the transmit side of port 1) to the restoration path connection (receive side of port k to transmit side of port 1). Upon successfully completing this roll operation, each transfer node reports its success to the CN, or if the operation cannot be successfully completed before a preset timeout, it instead reports the failed attempt to the CN. Of course, the CN itself may be one of the two transfer nodes, in which case it needs to receive a completion message from the opposite transfer node only.

The task of each node between the two transfer nodes is quite simple. When any such node receives a restoration trigger message, it simply accesses its database, identifies the connection that it needs to establish, proceeds to do so, then reports successful completion (or a failed attempt) to the CN.

In embodiments that do not employ the bridge-and-roll approach, the transfer nodes each simply switch to the restoration path. At node 17, for example, this constitutes a switch from the 1-j connection to the 1-k connection. However, this embodiment is less robust in that the inclusion of service verification in the DTN role may be more difficult if it requires monitoring for normal service signal onset at a receive port that is already cross-connected rather than still open.

In the above discussion, the state of the cross connect fabrics of the participant nodes is assumed to remain unchanged between the time the pre-plan message arrives and the time of actual restoration execution. In fact, this may not be true if a node is asked to execute a first restoration plan and, before another pre-planning session is complete, it is asked to execute a second restoration plan that calls upon the same spare resources. Even with just one plan in progress, it may simply happen that one or more of the pre-planned restoration channels fails before the next pre-planning session is complete.

If the command node receives a message of restoration failure from either transfer node, or link unavailability from one of the other participating nodes, restoration for that link is declared "failed". The control node then sends a message to the participating nodes to reverse the failed restoration plan for the particular path, and triggers backup restoration heuristics. The command node then waits for the next cycle of pre-planning to launch a new effort to restore that still failed link.

When a report of successful restoration of a path is received from all participating transfer nodes, the command node records the executed pre-plan for that path as part of the record-of current routing for the underlying end-to-end service. The bypassed partial path (between transfer nodes) is kept as the record for later normalization upon repair of the failed link.

Figure 3:
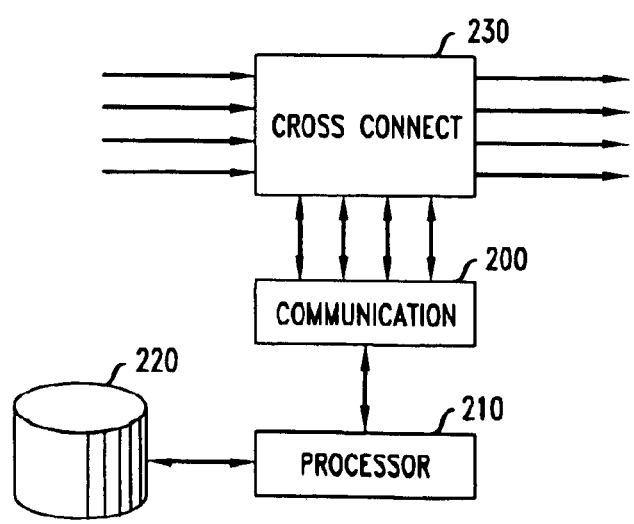
FIG. 3 presents a block diagram of that portion of a node that participates in the methods disclosed herein.

FIG. 3 presents a general block diagram of a node. It includes a communication module 200, for sending and receiving messages from the various transmission mediums that are connected to the node, a processing module 210, a database 220, and a cross connect switch 230. Processing module 210 interacts with database 220 and with communication module 200 and processes information in connection with the messages that flow through module 200. Among the processing that module 210 performs is:
  determination of whether it is a command node with
    respect to a particular link that emanates from the node,
  ascertainment of what facilities exist in its neighborhood
    availability of those facilities,
  the restoration pre-planning disclosed above, in connection
    with each link for which the node is a command node, analysis of failure conditions in the spans between the node and immediately adjacent nodes,
analysis of failure messages,
analysis of restoration condition messages,
requests to execute restoration plans,
carrying out of received requests to execute a restoration plan,
communicating with adjacent nodes about their operating status for which it is a backup command node, and
communicating with adjacent nodes about its operating status with respect to which it is a command node.

Of course, it is not very difficult to include the functions of communication module 200 in processing module 210. Database 220 maintains information, inter alia, about:
the links for which it is a command node,
the node's own restoration plans,
for which other nodes the node is a backup command node,
information about those nodes' restoration plans, and
information about restoration tasks that other nodes may expect it to execute.

Cross connect switch 230 carries out the inherent routing function of the node, as well as the routing functions that particular restoration plans may require.

What is claimed is:

1. A communication network that includes nodes $N_p$, p=1, 2, 3 . . . and link bundles $L_{pq}$, q=1, 2, 3 . . . that interconnect nodes p and q, where said link bundles are carried over physical physical spans of transmission facilities, the improvement comprising:

a neighborhood $M_p$ associated with each node $N_p$, wherein neighborhood $M_p$ may be different in size from neighborhood $M_p$, where size of a neighborhood designates number of hops included in the neighborhood; and node $N_p$ comprises a processing module that receives information about spare capacity in neighborhood $M_p$ and maintains a set of re-route plans that affect neighborhood $M_p$, or pointers to such plans wherein said processing module, upon receiving information of a failure condition of a type for which node $N_p$ is a backup node for purposes of re-routing, triggers execution of a pre-planned re-routing plan to bypass said failure condition when, in response to a query of a node $N_q$ that is a control node for said failure condition, node $N_p$ determines that node $N_q$ will not trigger said execution of said pre-planned re-routing plan.

2. The network of claim 1 wherein said triggering comprises transmitting a re-route plan to each node in neighborhood $M_p$ that is involved in a re-routing to bypass said failure condition.

3. The network of claim 1 wherein said triggering comprises transmitting a pointer for triggering execution of a re-route plan.

4. The network of claim 1 wherein said triggering comprises broadcasting a pointer for triggering execution of a re-route plan.

5. Apparatus including a plurality of ports, a cross-connect element coupled to said ports, and a control elements for effecting a path through said cross-connect element from a first port of said plurality of ports to a second port of said plurality of ports, the improvement comprising:

a processing module that determines, with respect to each of said ports, whether said apparatus is a control node that triggers rerouting in response to a failure indication associated with said ports, or is a backup node that triggers rerouting in response to a failure indication associated with said ports only when another apparatus is unresponsive;

wherein said processing module is designed to receive status change information from other apparatus that is structurally the same as said apparatus that is connected to said apparatus via said ports, and broadcasts the received status change information to said ports; and wherein said processing module receives status change information with a rebroadcast index, and rebroadcasts said status change information following an incrementing of said rebroadcast index.

6. Apparatus including a plurality of ports, a cross-connect element coupled to said ports, and a control elements for effecting a path through said cross-connect element from a first port of said plurality of ports to a second port of said plurality of ports, the improvement comprising:

a processing module that determines, with respect to each of said ports, whether said apparatus is a control node that triggers rerouting in response to a failure indication associated with said ports, or is a backup node that triggers rerouting in response to a failure indication associated with said ports only when another apparatus is unresponsive;

wherein said processing module is designed to receive status change information from other apparatus that is structurally the same as said apparatus that is connected to said apparatus via said ports, and broadcasts the received status change information to said ports; and wherein said communication module receives status change information with a rebroadcast index, and rebroadcasts said status change information, with said rebroadcast index incremenated, but only if said rebroadcast index is less than a preselected value.

* * * * *